May 26, 1942.   J. BRANCOLINO   2,283,965
CLUTCH
Filed Nov. 22, 1940
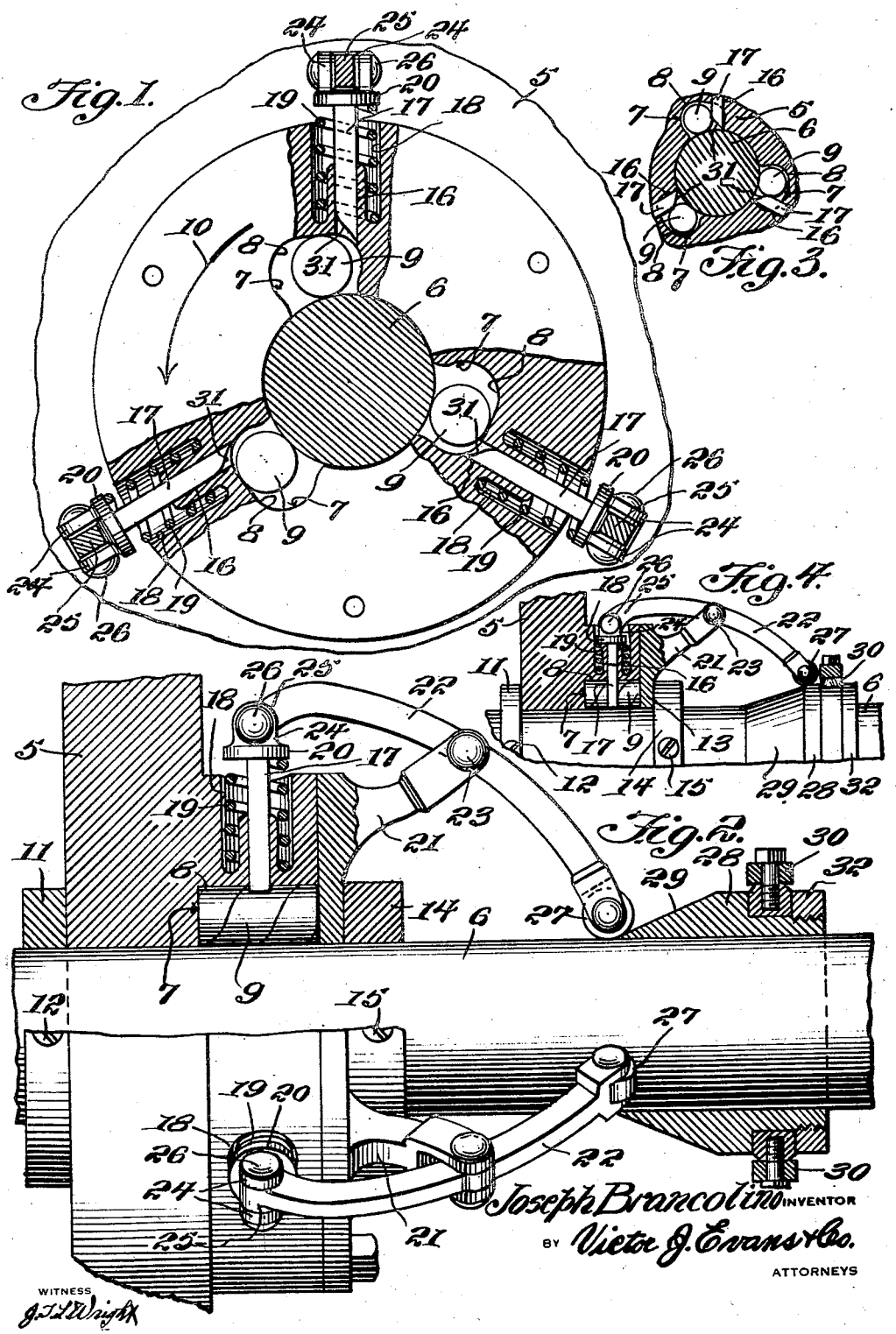
Joseph Brancolino INVENTOR
BY Victor J. Evans & Co.
ATTORNEYS
WITNESS Patented May 26, 1942

2,283,965

UNITED STATES PATENT OFFICE 2,283,965

CLUTCH

Joseph Brancolino, Riverside, Conn.

Application November 22, 1940, Serial No. 366,765

3 Claims. (Cl. 192—47)

The present invention relates to improvements in clutches primarily adapted for use in transmitting power for automobiles or other machinery in which power is transmitted from a wheel, pulley or the like to a shaft.

The primary object of the invention resides in the provision of means by which the clutch can be effectively operated to disengage the driving member from the driven member.

A further object of the invention is to provide a clutch that is simple in construction and operation and one having a minimum number of moving parts, the wear and damage of which is reduced to a minimum.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a vertical sectional view of a clutch embodying the features of the present invention.

Figure 2 is a partial longitudinal sectional view thereof.

Figure 3 is a detail vertical sectional view illustrating the position of the parts with the clutch disengaged.

Figure 4 is a fragmentary longitudinal sectional view illustrating the position of the parts for disengaging the clutch.

Referring to the drawing for a more detailed description thereof, a driving wheel, pulley or the like is generally designated by the reference numeral 5 and the driven member in the form of a shaft is designated by the reference numeral 6 and in the following description the member 5 will be termed a wheel but it is to be understood that said member may be any means for transmitting power to the driven shaft 6.

The wheel 5 has a series of grooves 7 formed on the inner side thereof, the outer walls 8 of which are arranged eccentrically of the shaft. Each groove is provided with a roller 9 normally in contact with the shaft 6 for driving said shaft upon rotation of the wheel 5. In the position shown in Figure 1 of the drawing, the wheel 5 is rotated in the direction of the arrow 10 which will cause the rollers 9 to become wedged between the shaft 6 and the face of the grooves 7 causing the shaft 6 to revolve with the wheel 5 and said rollers will be held in their wedged position until disengaged by a means to be hereinafter described.

The wheel 5 is held on the shaft 6 by means of a collar 11, said collar being locked to the shaft by a screw or other means 12. The rollers 9 are held in place by means of the plate 13 and said plate is locked in position by means of the collar 14 which is secured to the shaft 6 by a screw or other means 15. The collars 11 and 14 prevent axial movement of the wheel 5 and plate 13 while permitting the latter to freely rotate on said shaft.

Channels 16 are formed radially of the wheel 5 and communicate with the grooves 7 for slidably supporting the pins 17, said pins adapted to be actuated for disengaging the rollers 9 from the shaft 6 and forcing said rollers into the outer walls 8 of the grooves. Each channel 16 is surrounded by an enlarged passage 18 for receiving and supporting a spring 19 said spring surrounding the pin 17 and bearing against the pin head 20. The springs 19 normally retain the pins 17 in the retracted position shown in Figure 1 and are adapted to return said pins to normal position after actuation.

A series of angularly disposed upwardly diverging arms 21 extend from the plate 13, the ends of said arms being yoke-shaped for pivotally supporting the intermediate portion of the actuating levers 22 as indicated at 23. The levers 22 are of arcuate formation, one lever being provided for each pin 17. The pins 17 have their ends 20 formed with upwardly extending spaced flanges 24 for supporting therebetween one end 25 of the levers 22, said end being held within the flanges by means of a pin or the like 26. The opposite end of the levers 22 carry rollers 27 normally in contact with the shaft 6.

Any means can be provided for actuating the levers 22 for forcing the pins 17 downwardly against the tension of the springs 19 to disengage the rollers 9 from contact with the shaft 6. In Figure 2 of the drawing, however, there is shown a collar 28 having a tapered inner surface 29, said collar being axially slidable on the shaft 6. Any leverage means for effecting movement of the collar can be attached to the collar as indicated at 30 and upon moving said collar toward the wheel 5 the rollers 27 will move upwardly on the tapered surface 29 causing the levers 22 to fulcrum on their pivot 23. This movement of the levers 22 will force the pins 17 downwardly within the groove 7 so that the tapered ends 31 of the pins will contact the rollers forcing them into the outer walls 8. This position of the pins and rollers is shown in Figure 3 of the drawing and the position of the levers 22 upon forward movement of the collar 28 is shown in Figure 4. With the rollers held out of contact with the shaft 6, the wheel 5 is free to revolve about the shaft 6. When desiring to effect engagement of the rollers with the shaft, the collar 28 is moved outwardly away from the wheel 5 and as the rollers 27 descend from the tapered surface 29, the tension of the springs 19 will return the pins 17 to normal position. The construction is such that, upon rotation of the driving wheel 5, the rollers are normally urged into wedging contact with the shaft 6 to drive the latter with the wheel.

A threaded ring 32 is attached to the collar 28 for retaining the leverage attaching means 30 in position on the collar.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. A clutch mechanism of the character described comprising, a driving member and a driven member, said driving member having one face formed with a series of grooves, rollers mounted in said grooves having wedging contact with said driven member for transmitting power thereto from said driving member, means comprising radially moving pins extending radially of said driving member for moving said rollers out of wedging engagement with said driven member, means for operating said radially movable pins, said means including arms pivotally carried by said driving member and attached to said pins, and means for actuating said arms to depress said pins into engagement with said rollers.

2. Clutch mechanism of the character described comprising a driving member and a driven member, said driving member having one face formed with a series of grooves, rollers mounted in said grooves having wedging contact with said driven member for transmitting power thereto from said driving member, means comprising radially movable pins extending radially of said driving member for moving said rollers out of wedging engagement with said driven member, means for operating said radially movable pins, said means including a plate mounted on said shaft in abutting relation with said driving member, a series of angularly disposed upwardly diverging arms on said plate, an arcuate shaped lever pivoted intermediate its ends to each of said arms, one end of each lever attached to each of said pins, and means for actuating the said levers to depress said pins into engagement with said rollers.

3. In clutch mechanism of the character described, a driven rotary shaft member, a driving member mounted to rotate about the said shaft member, a plurality of circumferentially spaced recesses formed in one of the said members, a roller mounted in each of the said recesses normally urged into wedging contact with the said members to effect driving connection between the driving member and the shaft, a plurality of pins mounted radially in the driving member and slidable radially of the said member, each of the said pins being operable to move one of the rollers circumferentially of the said members and out of wedging engagement with one of the said members, a plurality of levers pivotally supported adjacent the said driving member, and means pivotally connecting one end of each of the said levers with the outer end of each of the radial pins for operating the pins.

JOSEPH BRANCOLINO.